July 31, 1962 J. S. EGGENBERGER ET AL 3,047,423
ISOTROPIC THIN MAGNETIC FILM
Filed Dec. 17, 1958

INVENTORS
JOHN S. EGGENBERGER
JOHN C. LLOYD
ROBERT S. SMITH
BY William J. Schelberg
AGENT United States Patent Office 3,047,423
Patented July 31, 1962

3,047,423

ISOTROPIC THIN MAGNETIC FILM

John S. Eggenberger, Wappingers Falls, and John C. Lloyd and Robert S. Smith, both of Poughkeepsie, N.Y., assignors to International Business Machines Corporation, New York, N.Y., a corporation of New York Filed Dec. 17, 1958, Ser. No. 781,117
4 Claims. (Cl. 117—107)

This invention relates to thin magnetic films and more particularly to a magnetic memory element which has square hysteresis loop characteristics in any direction of the film.

Thin magnetic memory film elements in the form of a thin magnetic layer of approximately 2,000 A. thick have been prepared in the past by deposition of ferromagnetic material, as for example, an 80–20% by weight alloy of nickel-iron, onto a suitable substrate member. When such films are formed in the presence of an externally applied magnetic field directed parallel to the plane of the film, the resultant element is observed to have significant uniaxial anisotropic properties. In particular the magnetization vector aligns itself in a preferred orientation in a direction in the plane of the film, termed the easy axis of magnetization. The extent to which the film is oriented in the easy direction is determined by the anisotropy constant and the corresponding anisotropy energy of the material. Such films are characterized as bistable elements in that they may be induced to switch from one stable state of magnetization along the easy axis to another stable state of reversed magnetization through the application of a magnetic field of sufficient magnitude to exceed the coercive force of the material. Such bistable elements, however, provide only a limited number of stable states of magnetization. It has been the object of considerable research, therefore, to prepare elements which have available a large number of stable states and which may be utilized in application as memory storage and logical devices in computer circuitry.

An object of the present invention is to provide an improved thin magnetic film element.

A further object of the present invention is to provide a thin memory element which will assume stable states of flux remanence in any direction of the film.

Still another object of this invention is to provide methods by which thin magnetic films having square hysteresis loop characteristics in any direction of the film may be conveniently prepared.

Other objects of the invention will be pointed out in the following description and claims and illustrated in the accompanying drawings, which disclose, by way of example, the principle of the invention and the best mode, which has been contemplated of applying that principle.

The present invention is based upon a discovery that as the anisotropy constant of a thin magnetic film approaches zero, domain walls in the film can form in any direction and thus the magnetization will remain in the direction to which it is set. Such films will hereinafter be referred to as being "isotropic." These films therefore have available a large number, in fact, an infinite number of stable states of magnetization which may be utilized to provide new and useful computer circuit devices.

According to the practice of the present invention, the isotropic magnetic films may be produced by electrodeposition or vacuum evaporation of suitable magnetic material on to a substrate member. In the electrodeposition method a first thin magnetic film layer in the form of a circular spot of material is prepared by plating a nickel-iron alloy onto a support member while an applied field is directed parallel to the plane of the film, or along the easy axis of magnetization. Thereafter the applied field is directed at a new angle with respect to the axis of easy magnetization of said first layer, preferably at about 90° to said axis, and a second thin magnetic film layer is deposited. The second layer thus possesses an easy axis which is oriented at said new angle. The coupling of the magnetization of the two layers results in a thin magnetic film which is observed to possess no preferential magnetic orientation but rather is an isotropic film.

The isotropic thin magnetic film elements of the present invention may be likewise prepared by a modification of the conventional vacuum evaporation techniques by which these films have been prepared in the past. Initially a thin magnetic film is deposited under vacuum onto a glass substrate in the presence of an externally applied magnetic field imposed parallel to the plane of the film. Thereafter the film is annealed at an elevated temperature, preferably about 400–800° C. without the presence of said magnetic field, for an extended period of time, usually over 3 hours. Films subjected to this annealing treatment are observed to exhibit the same isotropic characteristics as the films prepared by electrodeposition.

As shown in FIGS. 1(*a–d*) the isotropic thin magnetic films of the present invention display the square hysteresis loop characteristic in all directions in the plane of the film. Thus a memory element is provided which has available a large number of stable magnetic states suitable for use in digital computer circuitry.

Figure 1A:
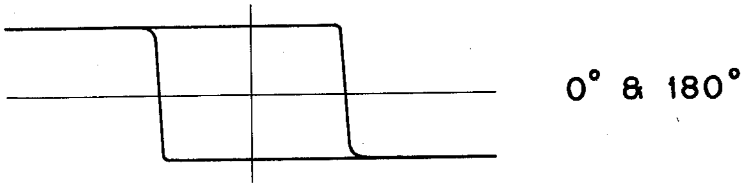
FIGURES 1(*a–d*) are reproductions of 60 cycle per second B-H loop pictures taken with a conventional hysteresis tester on the material of the present invention at various angles in the plane of the film, the switching fields being directed at 180° to each other.
Figure 1B:
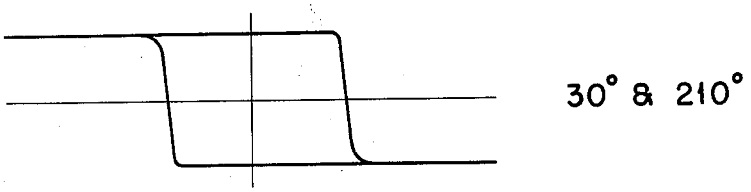
Figure 1C:
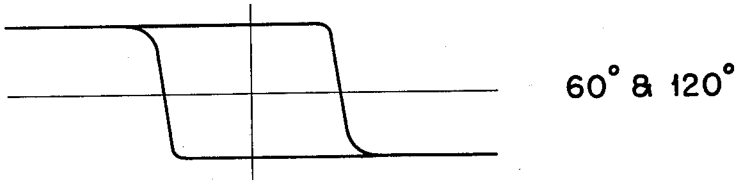
Figure 1D:
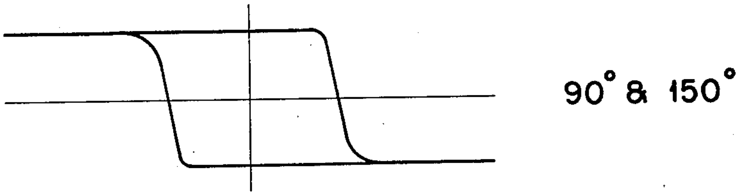
Figure 2:
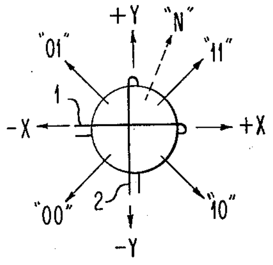
FIGURE 2 shows a schematic representation of the isotropic film of the present invention utilized as a multibit storage element.

While many useful computer devices may be constructed using the isotropic element described herein, FIGURE 2 illustrates one manner in which such a film may be used, having as a feature thereof multibit storage. Such a device may be advantageously utilized for both multivalued logic and memory storage. In the device as shown, write windings 1 and 2 are provided with pulses of appropriate polarity and magnitude to magnetize the element in one of the stable states available; four such states, 00, 01, 11 and 10, being shown for illustrative purposes. An infinite number of other useful states, represented as directions, however, are still available. Reading is accomplished by resetting the stored information to a desired direction, e.g. along the $+y$ direction, and simultaneously sensing the state of the stored information by means of the polarity and amplitude of the output voltage obtained.

Some switching characteristics of the element of this invention were obtained by applying a set field at various angles in the plane of the film and switching through the application of a reset field applied perpendicular to the set field. The switching constant along this perpendicular mode is independent of angle. The magnitude of this constant is 0.03 oersted-microsecond, indicating the element is extremely fast switching.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of invention. It is the intention therefore, to be limited only as indicated by the scope of the following claims.

.What is claimed is:

1. A method of making an improved thin magnetic film element which comprises electrodepositing a first continuous film of metallic magnetic material having a thickness of approximately 2000 A. onto a non-magnetic and electrically conductive substrate member in the presence of an external magnetic field applied parallel to the plane of the film and along the easy axis of magnetization, and subsequently depositing a second continuous film of the same material and the same relative thickness while the magnetic field is applied parallel to the plane of the film and at an angle to the easy axis of magnetization.

2. The method of claim 1 wherein said angle is 90°.

3. A method of making a thin magnetic film element by vacuum evaporation having substantially isotropic magnetic orientation comprising, the steps of depositing a continuous metallic film of ferromagnetic material having a thickness of approximately 2000 A. on a non-magnetic and electrically non-conductive substrate member in the presence of an external magnetic field applied in the plane of said film and thereafter annealing said film at elevated temperatures of 400° C.–800° C. for an extended period of at least three hours.

4. An isotropic thin magnetic film element prepared according to the process of claim 3.

References Cited in the file of this patent

UNITED STATES PATENTS

| | | |
|---|---|---|
| 2,671,034 | Steinfeld | Mar. 2, 1954 |
| 2,792,563 | Rajchman | May 14, 1957 |
| 2,798,843 | Slomin et al. | July 9, 1957 |
| 2,845,366 | Schroeder | July 29, 1958 |
| 2,853,402 | Blois | Sept. 23, 1958 |
| 2,856,313 | Gerber et al. | Oct. 14, 1958 |
| 2,879,211 | Kardos et al. | Mar. 24, 1959 |

FOREIGN PATENTS

| | | |
|---|---|---|
| 572,409 | Great Britain | Oct. 8, 1945 |

OTHER REFERENCES

Bozorth: Ferromagnetism, page 115, D. Van Nostrand Co., New York, 1951.